DANIEL GARVER.
Improvement in Grain-Separators.
No. 114,546.  Patented May 9, 1871.
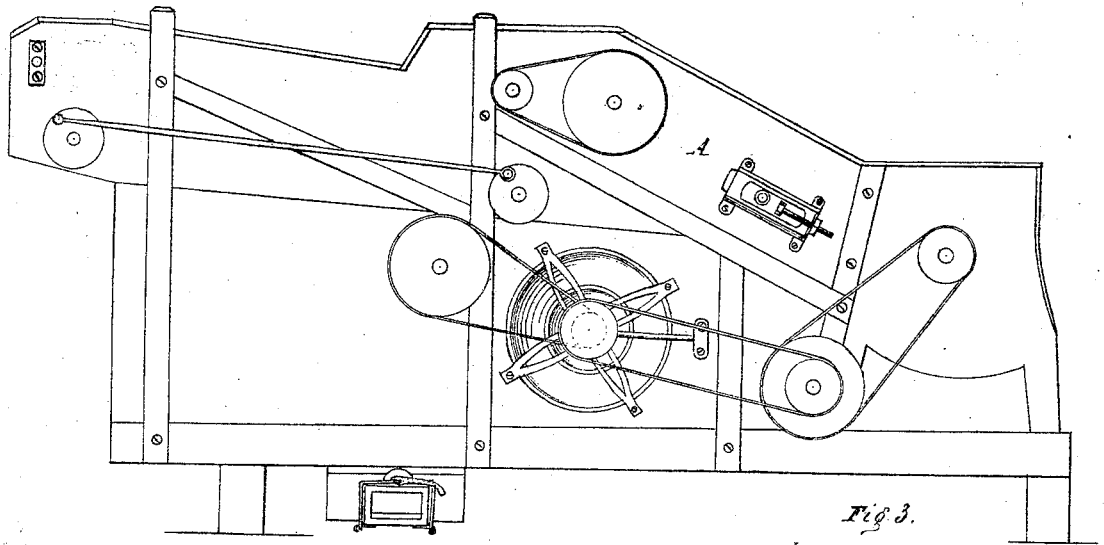
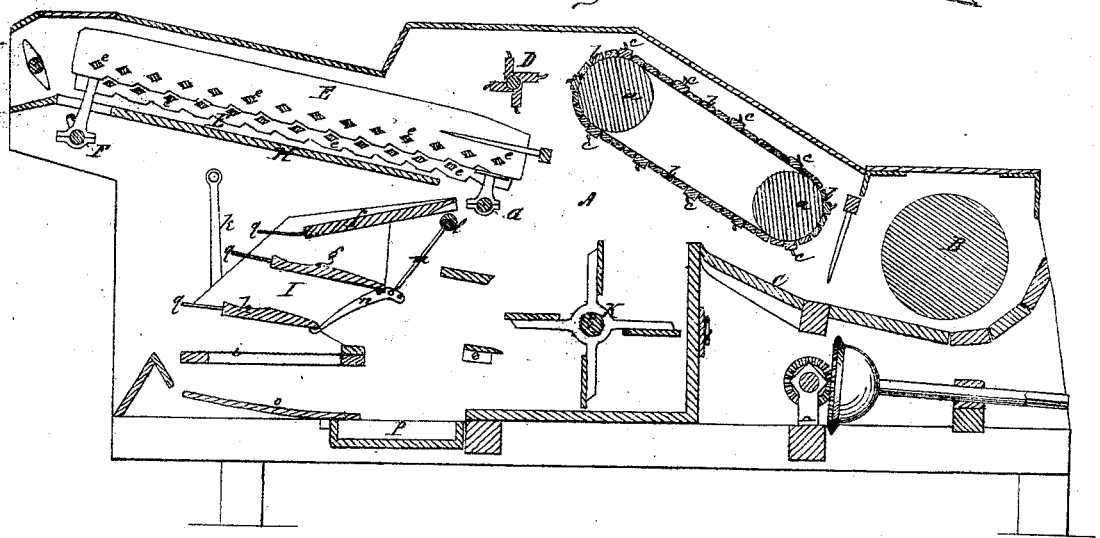
Witnesses:
Inventor:
D. Garver
per
Attorneys.

United States Patent Office.

DANIEL GARVER, OF RINGGOLD, MARYLAND, ASSIGNOR TO HIMSELF AND CYRUS GARVER, OF SAME PLACE.

Letters Patent No. 114,546, dated May 9, 1871.

---

IMPROVEMENT IN GRAIN-SEPARATORS.

The Schedule referred to in these Letters Patent and making part of the same.

---

*To all whom it may concern:*

Be it known that I, DANIEL GARVER, of Ringgold, in the county of Washington and State of Maryland, have invented a new and improved Grain or Seed-Separator; and I do hereby declare the following to be a full, clear, and exact description of the same, reference being had to the accompanying drawing making a part of this specification, in which—

Figure 1 is a side, and
Figure 2 a sectional elevation.

This invention relates to a mechanism for conveying grain, seed, straw, &c., after being thrashed, from the thrasher to the separator, and for separating grain or seed from chaff and filth.

Referring to the drawing—

$a$ $a$ are cylinders placed crosswise of the machine, the journals of said cylinders being mounted in the side frames A and driven by any suitable mechanism.

The cylinders $a$ carry a sufficient number of parallel endless belts, to which are secured slats $b$, in close contact and parallel with the cylinders, said slats having rabbets, and, being independent of each other, forming a carrier-apron, which always presents a closed outer surface while passing in rear of the thrasher B.

At proper intervals the slats $b$ are armed with outwardly-projecting teeth $c$, which make an endless rake of the said carrier-apron.

The thrasher discharges the stuff thrashed upon an inclined platform, C, placed under the endless rake, from which platform the rake conveys the stuff upward and forward to the separator.

A revolving picker, D, assists in passing the mixed mass over upon the separator.

Bars E are placed lengthwise of the machine, one at each side thereof, and the third intermediate of the others.

Said bars are made to reciprocate forward and backward, and also upward and downward, by being connected with cranks in cross-shafts F G, whereof the former is placed below the platform H, that is located beneath the separator, the cranks of the shaft F being connected with the bars by means of pitmen $d$, which pass through slots in the platform.

The cranks of the lower shaft G are connected directly with the bars.

The latter are furnished with laterally-projecting teeth $e$, those teeth that are attached to the middle bar extending to each side thereof, and those that are attached to the outside bars extending inwardly.

These sets of teeth pass between each other as the bars rise and fall, the bars being of such width that the teeth of one do not rise above the upper edge of another.

The teeth carry the straw and stems forward above the platform to the tail of the machine, where it falls out.

The grain or seed falls between the bars upon the platform, on which it is scraped forward by the teeth to the front end of the platform, whence it falls upon the winnowing apparatus.

This apparatus consists of three or more shelves, $f$ $g$ $h$, and a riddle, $i$.

The shelves are attached to end frames I, which are hung to the side frames A by means of rods $k$.

The upper shelf $f$, which is immediately under the rear edge of the platform H, rests on cams that form part of a cross-shaft, $l$, which gives all the shelves an upward and downward motion, and the shaft $l$ is furnished with cranks, which are connected by pitmen $m$ with arms $n$, that project from the shelves $g$ $h$, by which arrangement a backward-and-forward motion is imparted to the shelves.

The grain, chaff, &c., that fall from the separator upon the shelf $f$ are conveyed rearward by the motion of the latter till they fall upon the second shelf $g$, receiving during their fall the blast from the fan $k$, and being thereby partially winnowed.

That part of the shelf $g$ that first receives the grain is concave, while its front and lower part is inclined.

The grain is held in the concavity, and an additional portion of the chaff and filth passes down the incline and falls therefrom.

The grain is shaken from the concavity of the shelf $g$ and falls upon the third shelf $h$, being again subjected to the blast during this fall, and the remaining lighter stuff being thereby carried tailward. The third shelf is constructed like the second and operates in the same way.

The riddle $i$ receives the grain from the shelf $h$ and discharges the remaining white caps and filth toward the tail. From the riddle the grain falls upon the inclined platform $o$ and slides thence into the receiving-box $p$.

The shelves $f$ $g$ $h$ are provided with teeth $q$ on their rear sides, which serve to conduct straw away from the shelves and prevent it from falling on the shelves below.

Having thus described my invention,

What I claim as new, and desire to secure by Letters Patent, is—

1. In combination with the cylinders $a$ $a$, the endless rake and carrier, consisting of the slats $b$, armed with teeth $c$, and constructed with rabbets, as shown and described, which enable said carrier and rake to present a closed surface toward the thrasher, as specified.

2. The combination and arrangement of the vibrating shelves $f g h$, the two latter being constructed with concave surfaces, as described and shown, the end frames I, the shaft $l$, pitmen $m$, and arms $n$, as specified and set forth Witnesses:          DANL. GARVER.
SOLON C. KEMON,
THOS. D. D. OURAND.